United States Patent [19]
Mongredien

[11] 3,810,307
[45] May 14, 1974

[54] WIRE CUTTING AND STRIPPING PLIERS

[75] Inventor: Emile R. Mongredien, Epinay-sur-Seine, France

[73] Assignee: La Telemecanique Electrique, Hauts-de-Seine, France

[22] Filed: Jan. 19, 1973

[21] Appl. No.: 325,221

[30] Foreign Application Priority Data
Feb. 3, 1972  France .............................. 72.03619

[52] U.S. Cl. .............................................. 30/90.1
[51] Int. Cl. ............................................. H02g 1/12
[58] Field of Search ............ 81/9.5 R, 9.51; 30/90.1, 30/134

[56] References Cited
UNITED STATES PATENTS
| | | | |
|---|---|---|---|
| 2,844,056 | 7/1958 | Sladek | 81/9.51 |
| 2,902,894 | 9/1959 | Koos, Jr. | 81/9.5 A |
| 3,194,280 | 7/1965 | Mogestad | 81/9.51 X |

Primary Examiner—Al Lawrence Smith
Assistant Examiner—Roscoe V. Parker
Attorney, Agent, or Firm—Eric H. Waters

[57] ABSTRACT

Pliers for cutting and stripping wire with an insulating sheath comprise two handles each of which extend beyond the pivot of the pliers as two separated extensions, one extension of each handle being disposed between the two extensions of the other handle. Opposed cutting blades are fitted to adjacent lateral faces of the two central extensions, which blades have matching indentations in which the whole sheathed wire fits. The frontal faces of the extensions parallel to the pivotal axis of the pliers carry opposed pairs of stripping blades whose cutting edges have indentations matching the dimensions of the wire core. As the pliers are closed a wire is first cut through by the cutting blades and then the insulation on each cut end is stripped by the stripping blades.

9 Claims, 6 Drawing Figures

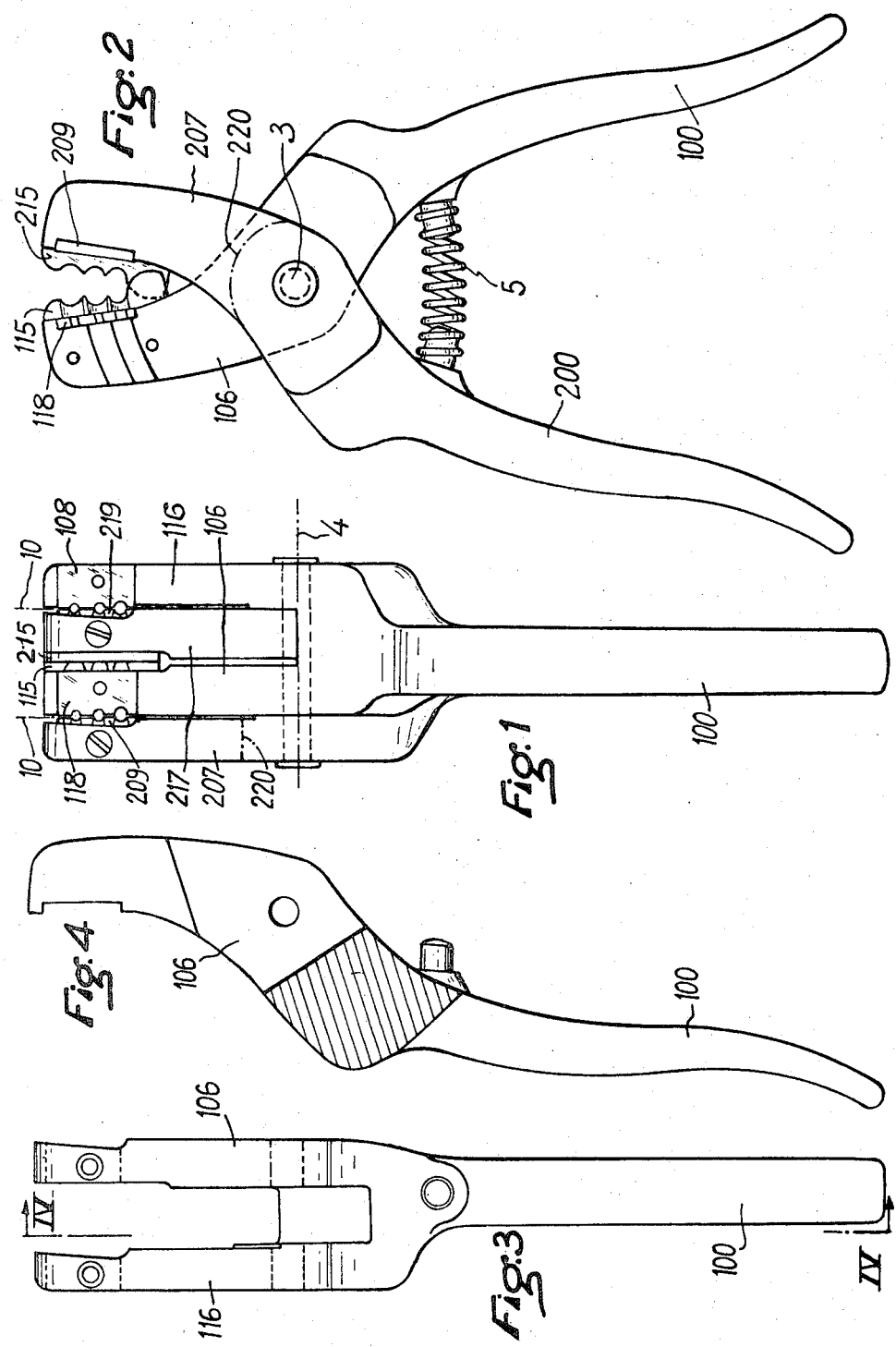

PATENTED MAY 14 1974 3,810,307

WIRE CUTTING AND STRIPPING PLIERS

BACKGROUND OF THE INVENTION

1. Field of the Invention

This invention relates to hand pliers which can be used for cutting and stripping a wire with a core covered by a sheath.

2. Description of the Prior Art

Pliers are already known for cutting and stripping insulated wires. An example of pliers of this kind is found in French Pat. No. 1,317,615. These pliers comprise a number of parts which are assembled by means of several joints, with the result that they are costly to manufacture.

A pair of hand pliers is also described in U.S. Pat. No. 2,902,894 which comprise one joint only round a single pivotal axis.

The pliers described in this United States Patent can only be used for stripping one end of a wire which has previously been cut.

A main object of the present invention is to provide a new pair of pliers which has the advantages of those known pliers and makes it possible simultaneously to cut a sheathed wire and to strip the two cut ends of the wire.

Another object of the invention is to provide a pair of cutting and stripping pliers which has only one joint which acts as the pivot for the handles of the pliers.

A further object of the invention is to provide a pair of cutting and stripping pliers which can be mass produced economically on a large scale since the pliers consist of a very small number of parts.

Yet another object of the invention is to provide a pair of pliers of the kind mentioned above which is produced by assembling identical parts designed to act symmetrically and which involve a low manufacturing cost.

SUMMARY

A pair of hand pliers for simultaneously cutting and stripping the cut ends of sheathed wire, comprise two handles mounted on a pivot and each extending beyond the pivot as two spaced-apart extensions. One extension of each handle is disposed between the two extensions of the other handle and the opposed lateral faces of the centrally located extensions are fitted with opposed cutting blades which are indented to match the outer dimensions of the wire and effect initial cutting through the wire as the pliers are closed. The frontal faces of the extensions parallel to the pivotal axis of the pliers carry opposed pairs of stripping blades which are indented to cut through the sheath only and strip the cut section of sheath from the cut ends of the wire as the closing movement of the pliers is continued.

BRIEF DESCRIPTION OF THE DRAWINGS

FIG 1 is a front view of pliers in accordance with the invention for the cutting and double stripping of a sheathed wire, FIG. 2 is a side view of the pliers of FIG. 1, shown open, FIG. 3 is a front view of a handle with two extensions which forms part of the pliers shown in FIGS. 1 and 2, FIG. 4 is a sectional view, taken along line IV—IV of FIG. 3.

DESCRIPTION OF THE PREFERRED EMBODIMENT

Figure 5:
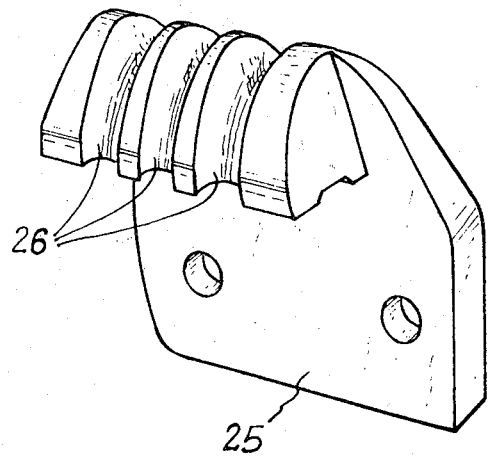
FIG. 5 is an example of a wire guide for the pliers of FIGS. 1 and 4.

Referring to the drawings a pair of pliers according to the invention comprise two handles 100 and 200 and a single pivotal joint, which is that of these two handles round a pivot 3 which has a longitudinal pivotal axis 4. This pair of pliers is for cutting an insulated wire at any point along its length and simultaneously stripping the two cut ends of the wire.

Handles such as the handle of FIGS. 3 and 4 are used. This handle 100 has two extensions 106 and 116 beyond the seating provided for the pivot 3, which extensions are parallel and separated by a distance somewhat greater than the width of one extension. Moreover these extensions 106 and 116 are identical, that is to say, they can be superimposed one upon the other by means of a simple translutional movement.

The two extensions 106 and 116 do not follow the direction of the handle exactly but are off-set angularly with respect to it, as can be seen in FIG. 4.

The two handles of the pliers need not necessarily be identical. However, in accordance with the invention it is especially advantageous to make up the pliers from two identical handles. In this case, as can be seen in FIG. 3, one of the extensions 116 is off-set transversely relative to the handle 100 by an amount which is greater than the off-set of the other extension 106.

By means of a pivot 3 it is possible to assemble two handles 100 which are exactly identical by introducing an extension of one between the extensions of the other. The result is then a pair of pliers as shown in FIGS. 1 and 2. Although the handles and their extensions are identical, for the sake of clarity they will be given different references, using the series 100 for one and 200 for the other.

A spring 5 is fitted between the handles to urge the pliers to the open position.

Referring to FIG. 1 it will be seen that there are two central extensions 106 and 217 and two outer extensions 116 and 207.

The two lateral faces of the central extensions 106 and 217 which are close to each other are each provided with a cutting blade respectively 115 and 215. These blades are inserted in opposition and are kept in position by screws and have indentations corresponding with one another so that they are capable of cutting an insulated wire placed between them.

The extensions have frontal faces on each side of the cutting blades. These faces are off-set, in pairs, relative to two separating planes 10 which are substantially perpendicular to these frontal faces. To each pair of frontal faces there are two grooved stripping blades which co-operate in pairs 118,209 and 108,219.

In the embodiment illustrated the cutting blades 115,215 are situated in a plane perpendicular to the pivoting axis. The frontal faces of the extensions carrying the stripping blades are flat and constitute planes which are parallel with the pivoting axis 4. Similarly to separating planes 10 are planes which are parallel with the plane of the cutting blades and are separated by a distance slightly more than twice the width of an extension.

When the pliers are open the frontal faces are turned towards each other but are off-set in pairs one with respect to another in a direction parallel with the pivoting axis 4. The same applies, consequently, to the stripping blades fixed to them.

The cutting edges of each pair of stripping blades 118,209 and 108,219 are opposed in pairs of each side of the separation planes 10. When the pliers are held in the position illustrated in FIG. 2 and the handles 100,200 are brought together, the stripping blades come close to one another and a moment arrives when their cutting edges are located in the same plane parallel with the pivoting axis 4 after which they move apart again when they have passed through this position.

With pliers having four extensions it is sometimes rather difficult to place and hold the wire in position opposite the indentations in the cutting blades which are proportioned to match the thickness of the sheath, or the indentations in the stripping blades which are proportioned to match the thickness of the core.

It is advantageous to provide at least one of the extensions with a wire guide as shown in FIG. 5, which is on a much larger scale than that employed for the other figures. The wire guide comprises a small plate 25 pierced by two holes which enable it to be fixed by means of screws to the lateral face of an outer extension. The plate 25 supports a protuberance which is hollowed out into grooves 26.

Figure 6:
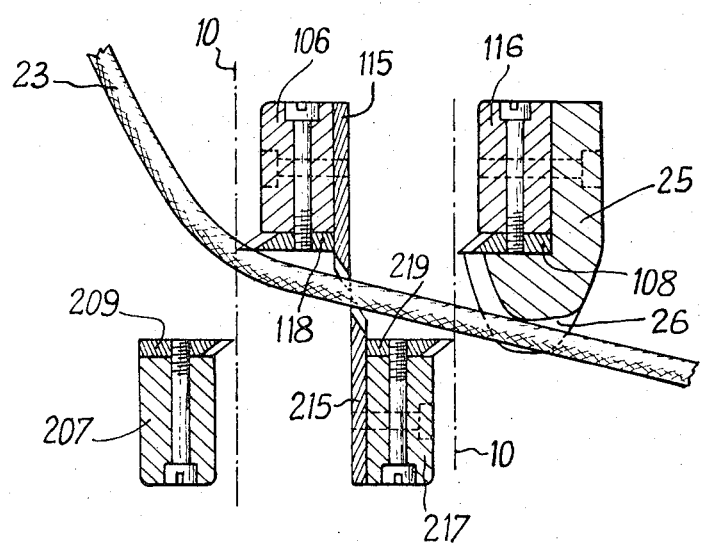
FIG. 6 is a sectional view, at the level of a wire which is to be stripped, of the extensions and the blades of the pliers shown in FIGS. 1 to 5.

In the right-hand part of FIG. 6 can be seen a wire guide which is fixed by its plate 25 to the lateral face of the extension 116. The arrangement is such that the grooves 26 of the protuberance form extensions of the indentations in the stripping blade 108 of the extension 116. The protuberance is so designed that the grooves 26 extend from the indentations in the stripping blade 108 in a direction at an angle to the separation plane 10 associated with the blade 108.

FIG. 6 shows how a wire 23 is disposed, for cutting into lengths and stripping, between the blades of a pair of pliers in the open position as in FIGS. 1 and 2.

The straight wire is inserted in the groove 26 which corresponds to the thickness of its sheath. As soon as it begins to be squeezed between the cutting blades 115 and 215 it is bent by engagement in an indentation in the stripping blade 188 which corresponds to the thickness of its core and is given a slanting direction which facilitates stripping.

The wire guide 25 of the extension 116 allows the wire to assume this slanting position. Cutting is effected by the cutting blades 115 and 215 and immediately afterwards the left-hand end of wire thus created is squeezed as shown in FIG. 6, between the stripping blades 209 and 118, and the right-hand end of the wire is squeezed betweenn the stripping blades 219 and 108. As the closing of the pliers is continued the stripping blades approach one another in pairs until they are facing one another but still remaining on one side and the other, respectively, of the separation planes 10.

During this approach of the stripping blades the wire tends to assume a direction approaching the plane 10, more specifically the direction of the groove 26 in the wire guide 25 on the right-hand side of FIG. 6. At the same time the stripping blades penetrate the sheath cutting almost through it, and the indentations formed in these blades almost surround the metallic core of the wire.

As the pliers are closed still further the blades, continuing their movement, start to move apart from one another pushing in front of them the sheath which has been cut. Each blade rests against half of the annular surface of the sheath. Each short length of sheath, its length defined by the distance between each plane 10 and the cutting blades 115,215, is taken away from the wire, respectively by the stripping blades 118 and 219. The other two stripping blades 209 and 108 then hold, respectively, the remainder of the wire and its sheath.

Thus it is possible to cut an insulated wire at any point and strip the two cut ends simultaneously. The number of parts in the pliers is small and its cost price is very low because the handles, with their extensions, are identical. They are produced with a single mould by the moulding of a metallic alloy. They are assembled quickly; this is done by a single pivot 3, which is the only joint in the pliers, and a spring 5 is interposed.

The cutting blades 115,215 are identical. The same applies to the stripping blades 108,118 and 209,219; these can be superimposed by longitudinal movement or by turning over. It is very simple to fit and replace them.

I claim:

1. In pliers for cutting and stripping a wire having a core and a sheath surrounding the core, comprising two handles, and a pivot having a longitudinal pivotal axis about which the handles are pivoted, the improvement whereby each handle has, beyond the pivot two extensions which are separated by a distance slightly greater than the width of one said extension, one extension of each handle is disposed between the two extensions of the other handle, the two centrally located extensions have lateral faces close to each other which are fitted with opposed cutting blades, the four extensions have frontal faces situated in planes parallel with the pivotal axis and opposed in pairs on each side of two spaced separation planes, substantially perpendicular to these frontal faces, the frontal faces are fitted with stripping blades parallel with the pivotal axis, and the stripping blades have cutting edges which are opposed in pairs of each side of the separation planes and are formed with matching indentations which correspond to the diameter of the core of the wire to be stripped.

2. Pliers as claimed in claim 1, wherein the two handles, each with their two extensions are identical with each other.

3. Pliers as claimed in claim 2, wherein the two cutting blades are identical.

4. Pliers as claimed in claim 2, wherein the four stripping blades are identical.

5. Pliers as claimed in claim 2, wherein the two extensions of each handle are off-set angularly beyond the pivot relative to the direction of the handle, and one of the extensions is off-set transversely with respect to the handle by an amount greater than the other extension.

6. Pliers as claimed in claim 2, wherein the cutting blades are located in a plane perpendicular to the pivotal axis and the separation planes are parallel with said plane of the cutting blades and are separated by a distance slightly more than twice the width of an extension.

7. Pliers as claimed in claim 1, wherein the cutting blades are formed with matching indentations whose dimensions correspond to the size of the sheath of a wire.

8. Pliers as claimed in claim 1, wherein at least one of the outer extensions is fitted with a wire guide consisting of a part built on to a stripping blade and formed with grooves extending from the indentations in this blade, which grooves extend from said blade in a direction at an angle to the separation plane associated with this blade.

9. Pliers as claimed in claim 8, wherein the dimensions of the grooves correspond to the size of the sheath of a wire.

* * * * *